United States Patent
Cleary et al.

(10) Patent No.: US 9,675,040 B2
(45) Date of Patent: Jun. 13, 2017

(54) DUAL SPECTRUM ILLUMINATOR FOR CONTAINERS

(75) Inventors: Daniel Cleary, Portland, OR (US); Carlos I. Fonck, Pasadena, CA (US); Henry A. Lester, South Pasadena, CA (US); Michael P. Walsh, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 645 days.

(21) Appl. No.: 11/825,912

(22) Filed: Jul. 10, 2007

(65) Prior Publication Data

US 2008/0013304 A1 Jan. 17, 2008

Related U.S. Application Data

(60) Provisional application No. 60/830,635, filed on Jul. 13, 2006.

(51) Int. Cl.
- *A01K 1/03* (2006.01)
- *A01G 7/04* (2006.01)
- *A01K 63/06* (2006.01)
- *H05B 37/02* (2006.01)

(52) U.S. Cl.
CPC ............... *A01K 1/031* (2013.01); *A01G 7/045* (2013.01); *A01K 63/06* (2013.01); *H05B 37/0281* (2013.01); *Y02B 20/42* (2013.01); *Y02P 60/146* (2015.11)

(58) Field of Classification Search
CPC ........ F21Y 2101/02; F21K 9/00; F21S 10/02; F21V 33/0028; F21W 2121/00; G02B 6/0001; G02B 6/0008; A01G 7/045

USPC ................. 362/231, 563, 800, 805
See application file for complete search history.

(56) References Cited

U.S. PATENT DOCUMENTS

| | | | |
|---|---|---|---|
| 3,367,308 A | | 2/1968 | Quattrone et al. |
| 3,413,958 A | | 12/1968 | Artig |
| 3,424,231 A | | 1/1969 | Truhan |
| 3,464,388 A | | 9/1969 | Stout |
| 3,585,356 A | | 6/1971 | Hall |
| 3,621,233 A | * | 11/1971 | Ferdinand et al. .......... 362/355 |
| 3,967,301 A | * | 6/1976 | Corning .......................... 396/3 |
| 4,201,153 A | | 5/1980 | Nace |
| 4,332,214 A | * | 6/1982 | Cunningham ............... 119/28.5 |
| RE31,023 E | * | 9/1982 | Hall, III ......................... 405/37 |

(Continued)

FOREIGN PATENT DOCUMENTS

| | | |
|---|---|---|
| JP | 01187036 A | 7/1989 |
| JP | 10-178901 | 7/1998 |
| KR | 20-2006-011643 | 7/2006 |

OTHER PUBLICATIONS

PCT International Search Report for PCT/US2007/015737 filed on Jul. 10, 2007 in the name of California Institute of Technology.

(Continued)

*Primary Examiner* — Jong-Suk (James) Lee
*Assistant Examiner* — Mark Tsidulko
(74) *Attorney, Agent, or Firm* — Steinfl + Bruno LLP

(57) ABSTRACT

The disclosed device provides uniform illumination of variable intensity for a plant or animal container, e.g., a rodent cage, using infrared and broad spectrum light. Manual control or a timer can be provided. The device can mount on top of the container without need for substantial modification of the cage-or cage configuration.

30 Claims, 5 Drawing Sheets

(56) References Cited

U.S. PATENT DOCUMENTS

| | | |
|---|---|---|
| 4,396,872 A | 8/1983 | Nutter |
| 4,448,150 A | 5/1984 | Catsimpoolas |
| 4,464,658 A | 8/1984 | Thelen |
| 4,543,744 A | 10/1985 | Royster |
| 4,646,293 A | 2/1987 | Okada et al. |
| 4,701,415 A | 10/1987 | Dutton et al. |
| 4,914,858 A | 4/1990 | Nijssen et al. |
| 4,923,816 A | 5/1990 | Heeg et al. |
| 5,012,609 A | 5/1991 | Ignatius et al. |
| 5,061,630 A | 10/1991 | Knopf et al. |
| 5,164,755 A | 11/1992 | King |
| 5,283,974 A | 2/1994 | Graf, Jr. |
| 5,299,383 A | 4/1994 | Takakura et al. |
| 5,608,209 A | 3/1997 | Matsuda |
| 5,660,461 A | 8/1997 | Ignatius et al. |
| 5,664,232 A | 9/1997 | Goto |
| 5,685,637 A | 11/1997 | Chapman et al. |
| 5,915,332 A | 6/1999 | Young et al. |
| 5,946,852 A | 9/1999 | Oram et al. |
| 5,946,853 A | 9/1999 | Jacobs et al. |
| 5,970,471 A | 10/1999 | Hill |
| 6,220,722 B1 | 4/2001 | Begemann |
| 6,255,103 B1 | 7/2001 | Tamaoki et al. |
| 6,312,139 B1 | 11/2001 | Baker et al. |
| 1,041,167 A1 | 6/2002 | Rogers |
| 6,554,450 B2 * | 4/2003 | Fang et al. ............ 362/231 |
| 6,600,175 B1 | 7/2003 | Baretz et al. |
| 6,606,453 B2 | 8/2003 | Saigo et al. |
| 6,788,886 B2 * | 9/2004 | Saigo et al. ............ 396/4 |
| 6,953,266 B1 | 10/2005 | Ver Hage et al. |
| 6,965,205 B2 | 11/2005 | Piepgras et al. |
| 7,086,350 B2 | 8/2006 | Tecott et al. |
| 7,158,379 B2 * | 1/2007 | Sanders et al. ............ 361/703 |
| 7,180,252 B2 | 2/2007 | Lys et al. |
| 7,379,291 B2 * | 5/2008 | Quazi ............ 361/674 |
| 2001/0047618 A1 | 12/2001 | Fang et al. |
| 2003/0005626 A1 * | 1/2003 | Yoneda et al. ............ 47/69 |
| 2005/0115865 A1 * | 6/2005 | Matsutori et al. ............ 206/710 |
| 2005/0207141 A1 * | 9/2005 | Boesch et al. ............ 362/101 |

OTHER PUBLICATIONS

PCT Written Opinion for PCT/US2007/015737 filed Jul. 10, 2007 in the name of Daniel Cleary et al.

* cited by examiner

DUAL SPECTRUM ILLUMINATOR FOR CONTAINERS

CROSS REFERENCE TO RELATED APPLICATIONS

The present disclosure claims the benefit of U.S. Prov. Ser. No. 60/830,635 for a "Dual Spectrum Rodent Cage Illuminator" filed on Jul. 13, 2006, the disclosure of which is incorporated herein by reference in its entirety.

GOVERNMENT SUPPORT

The U.S. Government has certain rights in the present invention pursuant to Grant Nos. NS046464, NS04380, NS11756 & DA017279 awarded by the National Institute of Health

FIELD

The present disclosure relates to illumination devices. In particular, it relates to a controllable illumination device for animals and/or plants in a container, where a dual spectrum illumination can be provided

BACKGROUND

Global genomic U.S. Pat. No. 4,448,150 describes a system that uses side-mounted lights for monitoring animals. U.S. Pat. No. 5,608,209 relates to quantification of specific animal behaviors and describes a system using optical emitters in conjunction with optical sensors to measure behaviors within the cage. U.S. Pat. No. 5,685,637 discloses an illumination device that uses a single broad-spectrum light bulb in combination with a ring of infrared light-emitting diodes (LEDs). U.S. Pat. No. 6,953,266 describes a system for illuminating animal cages in a rack. The system uses LEDs and fiber optic cables to light the cages from the side. U.S. Pat. Nos. 5,915,332 and 7,086,350 are for systems designed to monitor and measure animal behaviors. They both focus on methods and systems to monitor specific behaviors using indicators for these behaviors.

SUMMARY

According to a first aspect of the present disclosure, an illumination or lighting device is provided, comprising a container and a panel located above the container, the panel comprising a plurality of infrared LEDs and broad-spectrum LEDs, wherein the infrared LEDs and the broad-spectrum LEDs are uniformly distributed along the panel. This uniform and consistent dispersion of light, the low cost of lights, and the easy manageability make LEDs a cheaper and more practical lighting solution than fiber optics as a lighting source. The intensities of the broad-spectrum LEDs and the infrared LEDs can be independently adjustable.

According to a second aspect of the present disclosure, a device for continuous monitoring of animals or plants in a container is provided, comprising: a first plurality of illumination devices providing light at a first wavelength or first series of wavelengths; a second plurality of illumination devices providing light as a second wavelength or second series of wavelengths, the second wavelength or second series of wavelengths being invisible to the animals; a first light intensity regulator to control light intensity of the first plurality of illumination devices; and a second light intensity regulator to control light intensity of the second plurality of illumination devices.

The overhead lighting provided in accordance with the present disclosure allows the entire cage to be uniformly illuminated and the shadows within the cage to be illuminated. Elimination of the shadows eliminates some of the difficulties associated with computer-based behavior monitoring. The lid-based lighting source maximizes compatibility with existing cage and rack systems, and a lid mounted system also avoids the light distortions that are associated with, side-mounted lighting systems.

The dual spectrum lighting system described in the present application is for use with off-the-shelf CCD (charge-couple-device) video recording systems with or without infrared capability. Since mice cannot see at infrared wavelengths, the dual spectrum lighting system facilitates uninterrupted and automated video monitoring day or night, possibly in combination with a timer and a light intensity controller. The device can neatly fit into most existing cage and rack systems without need for significant modification of the enclosure.

A further advantage of the present disclosure is that rodent behavior is monitored in a laboratory setting without disturbance, thus providing a natural and non-invasive environment for animal monitoring using imaging technology.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this disclosure, illustrate one or more embodiments of the present disclosure and, together with the detailed description, serve to explain the principles and implementations of the disclosure.

In the drawings.

Like reference symbols in the various drawings indicate like elements.

DETAILED DESCRIPTION

The present disclosure will describe in detail a device providing uniform illumination of variable intensity for a container, e.g., a single rodent cage, using infrared and broad spectrum light (L) together with a manual control or a timer. The device will mount on top (33) of the rodent cage without need for substantial modification of the cage or cage configuration. To fit into an existing cage enclosure, the device will be screwed into, mounted onto, or otherwise affixed to the corners of the cage lid. When attaching it to the cage lid, the device can be mounted a small distance from the container top (33) to allow for proper air circulation (F). In a further embodiment of FIG. 5, the device is comprised of a circuit board that is slightly larger or slightly smaller than the size of an existing indentation (34) in the container top (33). Therefore, an alternative implementation fits the device into the indentation (34) on the container top (33), standing off from the bottom (36) of the indentation by approximately 5 mm inert standoffs attached to the board.

Figure 1:
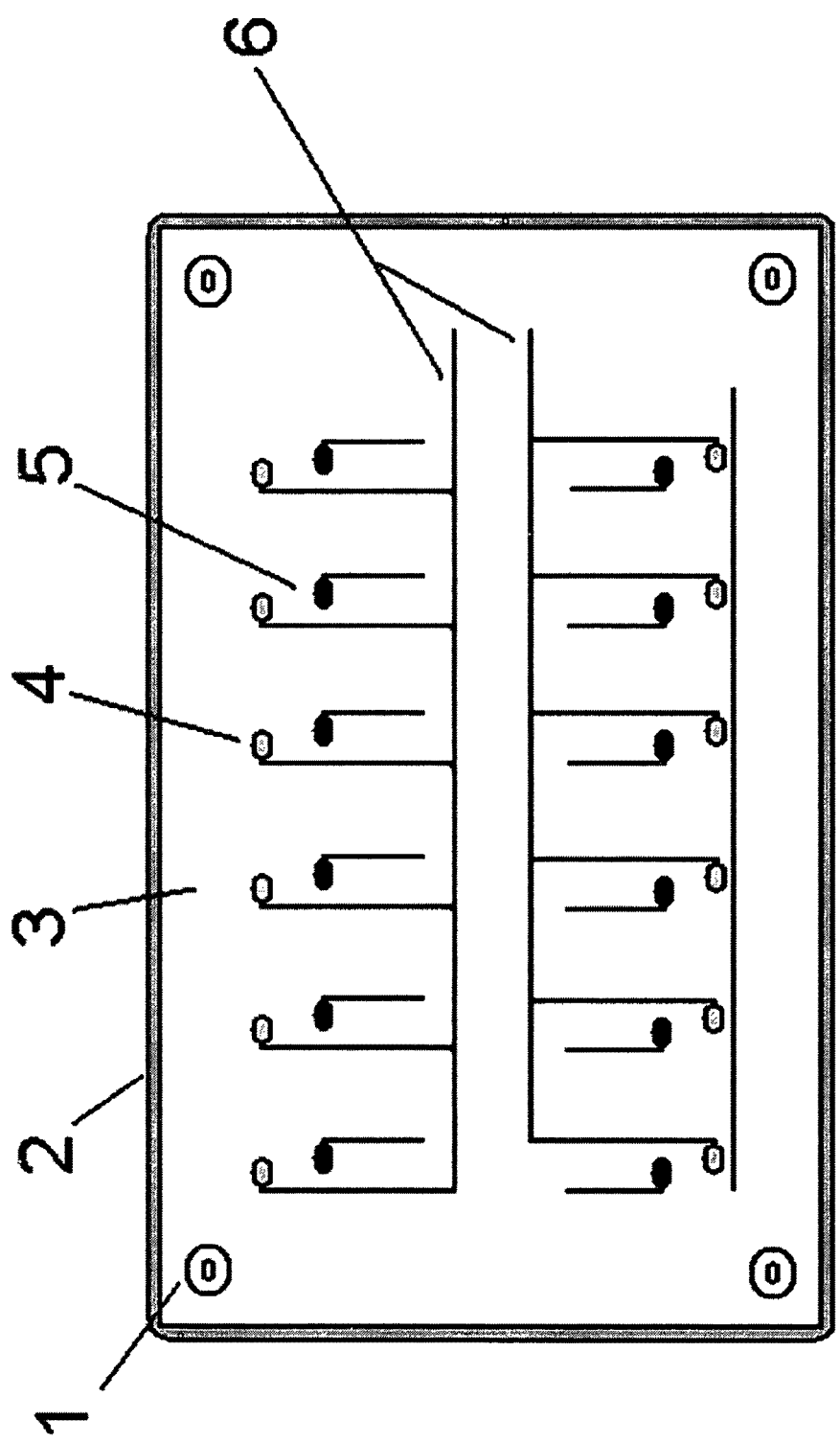
FIG. 1 is a view from the top of an arrangement to be put on top of the lid of a cage.

FIG. 1 is a view from the top of the system of an arrangement to be put on top (33) of the lid of a cage. The arrangement comprises a thin electronic circuit board (3) mounted onto the lid (2). The circuit board (3) connects to the cage via a set of screws (1) that extend from a hole drilled in the board (3) into existing screw ports on the cage lid (2). A plurality of LEDs (4) are connected together on the board (3) through printed circuits (6) with a resistor (5) after each LED (4). In the embodiment of FIG. 1, all of the LEDs (4) are connected in parallel. Alternative embodiments can be devised, where the LEDs are connected in series or part in series and part in parallel. The LEDs (4) are infrared LEDs. These LEDs emit light (L) at a wide enough angle as to allow each LED to contribute to the illumination of the entire cage and can be customized to emit light at a wavelength of 880, 920 or 940 nm. The printed circuits (6) supply power to the LEDs from a 120 V (60 Hz) alternating current (AC) power supply, not shown in FIG. 1. Alternatively, the system can be configured to use direct current (DC) power supply or 220 V (50 Hz) alternating current.

A layer of filter paper (30) is located inside the cage lid (2), as later shown in FIGS. 4 and 5. The filter paper acts as a dispersion device for the light (L) coming from the LEDs (4). Optionally, as shown in FIG. 5, the device of the present disclosure can be provided with an array of holes (37), to provide for improved air circulation (F).

Figure 2:
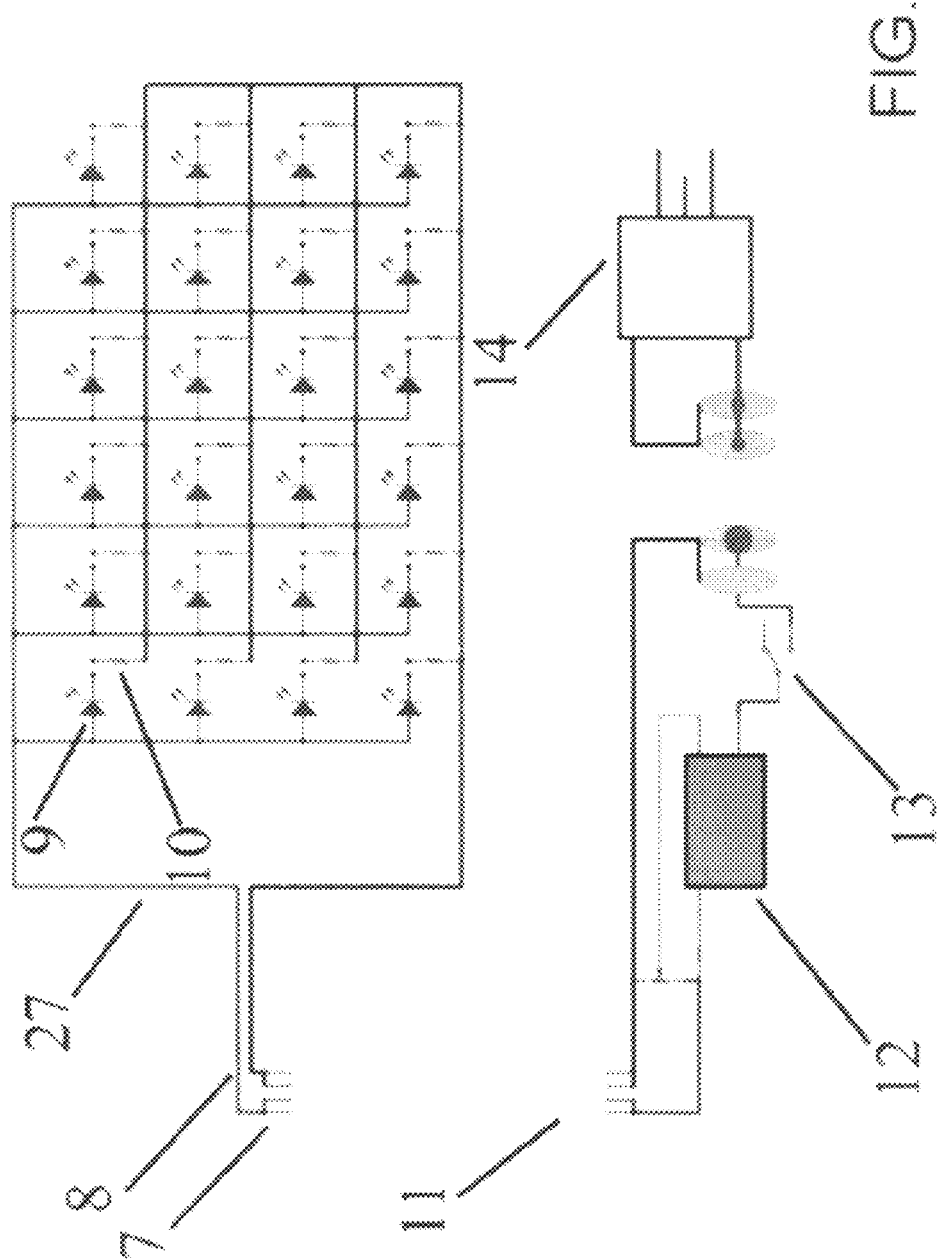
FIG. 2 shows a first circuital diagram of the present disclosure.

FIG. 2 is a circuital diagram for an embodiment where only infrared LEDs are used.

In particular, reference numeral (9), which indicates a diode in FIG. 2, corresponds to reference numeral (4) in FIG. 1. Similarly, reference numeral (8) of FIG. 2 corresponds to reference numeral (6) of FIG. 1, and reference numeral, (10) of FIG. 2 corresponds to reference numeral (5) of FIG. 1. As shown in FIG. 2, the electrical connection of the cage lid (2) of FIG. 1 to a power supply is obtained through a printed circuit connection (8) and a socket (7). In particular, the socket (7) and the connection (8) supply DC power to the LEDs (9), wherein each LED (9) is followed by a resistor (10). The LEDs shine light through the filter paper described with reference to FIG. 1 above and illuminate the inside of the rodent cage.

Still with reference to FIG. 2, the power supply is connected to the illuminating device via a power supply socket connection (11) which connects to the lid socket connection (7) described above. The socket connection (11) can be physically disconnected for changes in cage configuration, cleaning and mobility. The power supply socket connection (11) is connected to a voltage regulator (12) which, in turn, is connected to a power switch (13). The voltage regulator (12) is a mechanical device through which an end user can physically adjust the amount of voltage going into the circuit board (3). The level of the voltage at the LEDs causes them to brighten or dim. Therefore, the voltage regulator (12) acts as a luminescence intensity adjuster. The power switch (13) allows breaking of the circuit, thus removing power from the LEDs. The converter (14) connects the power switch (13) to a 120 V (60 Hz) power supply coming from an outside source. The converter (14) changes AC power into DC for use into the device.

Figure 3:
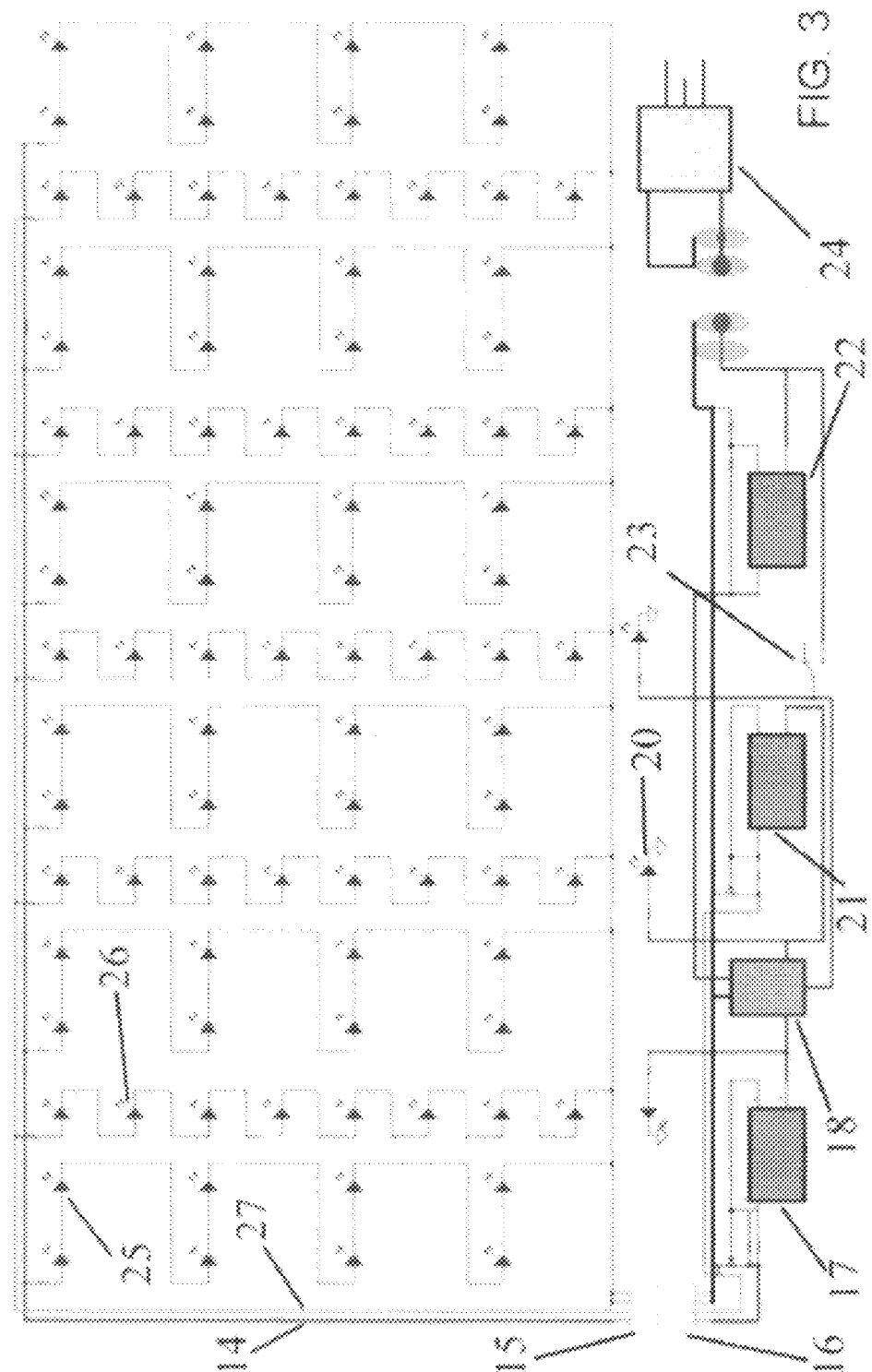
FIG. 3 shows a second, dual spectrum, circuital diagram of the present disclosure.

FIG. 3 shows a circuital arrangement of a further embodiment of the present disclosure, where two sets of LEDs are provided, infrared and visible (e.g., broad spectrum). According to this embodiment, independent circuits, timers and voltage regulators are provided. As shown in FIG. 3, two sets of LEDs (25, 26) are provided. The LEDs (25, 26) are independently connected (14, 27) to the downstream circuitry. The LEDs of each set are connected in series, to minimize wasted power.

Both sets of LEDs are connected to a first socket (15), similarly to what shown in the previous embodiment. Connection between the socket (15) and the power supply is obtained through a further socket (16), which allows connection of the LEDs (25, 26) to three distinct voltage regulators (17, 21 and 22) and a timer (18). The voltage regulators (17, 21 and 22) are further connected to a power switch (23). Similarly to the previous embodiment, the power switch (23) allows closing or breaking of the circuit, thus turning the device ON or OFF. The three voltage regulators (17, 21 and 22) control the voltage going to the sets of LEDs and thus the intensity of the light. A first voltage regulator (17) controls the intensity of the infrared LEDs. A second voltage regulator (21) controls the intensity of the broad-spectrum LEDs. A third voltage regulator (22) controls the overall voltage. The overall voltage controller (22) can decrease or increase the intensity of both sets of LEDs (25, 26) at the same time.

The timing device (18) can break or close the circuit for each set of LEDs (25, 26) based on timing-specific programming. The timing device (18) is also connected to two indicator LEDs (19, 20) that show when each circuit is active. The entire power supply portion of the device is connected to an AC/DC converter (24), which takes 120 V (60 Hz) AC power from an outside source and converts it to DC.

Figure 4:
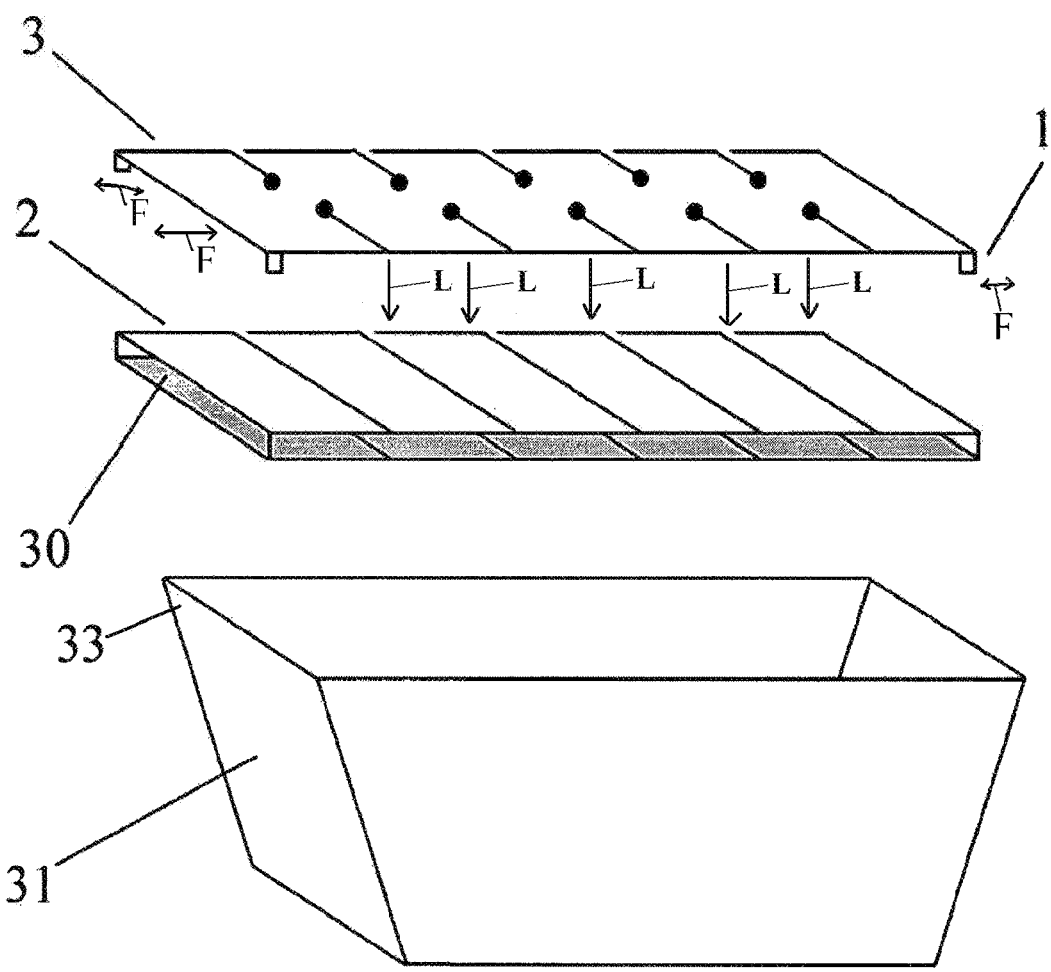
FIGS. 4 and 5 show further embodiments of the disclosure where a layer of filter paper is provided.
Figure 5:
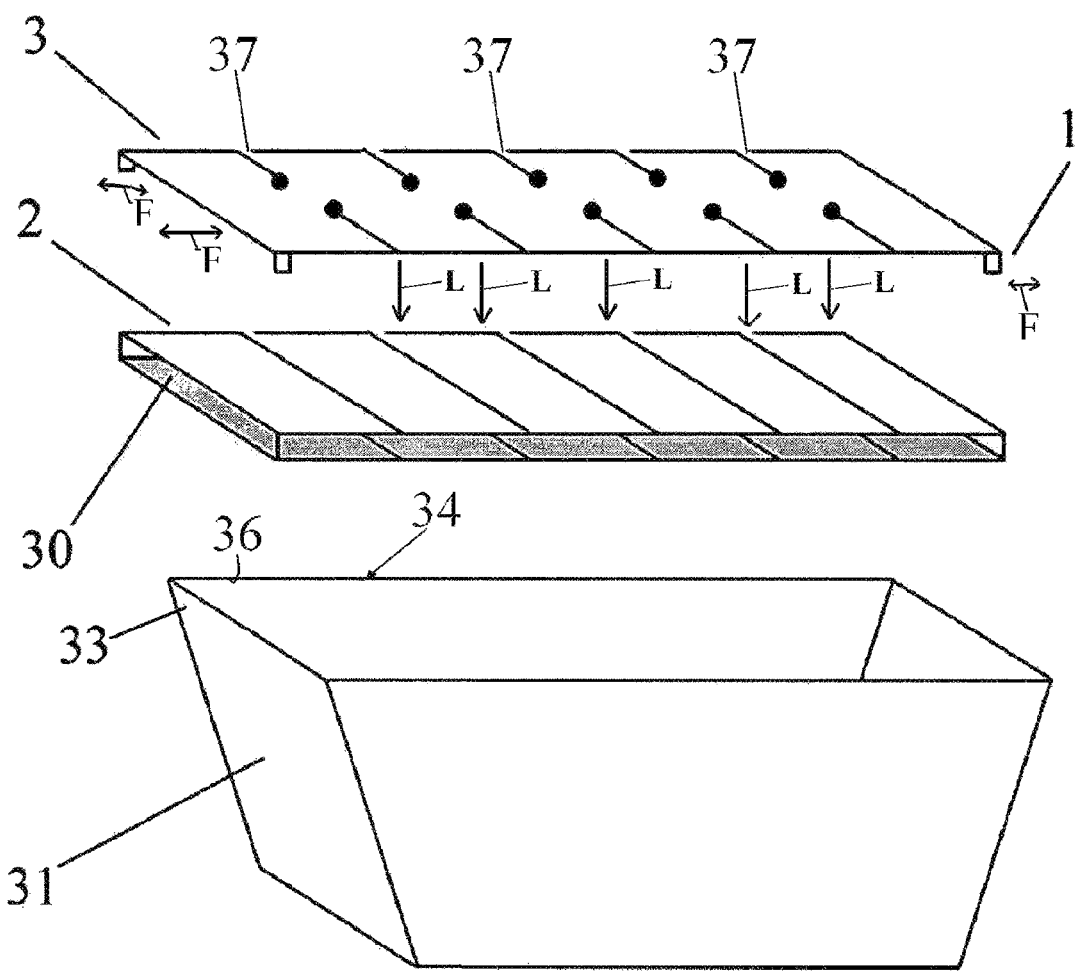

FIGS. 4 and 5, as already mentioned above, show further embodiments of the present disclosure where a layer (30) of filter paper is located inside the cage lid (2) and put on top (33) of the cage or container (31). The board sits atop the container (FIG. 4) or in the indentation (34) of the top (33) of the cage (FIG. 5), and shines light (L) onto the interior of the cage through the layer (30) of filter paper. The diffuse illumination of the container provides a favorable environment for recording using off-the shelf CCD camera equipment capable of detecting or recording both visible and IR light. As an additional implementation, an array of holes (37) is drilled into the board, in a pattern that avoids the wiring. The array of holes further allows air circulation (F) into and out of the layer (30) of filter paper. The board also includes room to mount a standard microphone, or an ultrasonic microphone. The sounds produced by the rodents readily travel through the layer (30) of filter paper and can be recorded in sync with video data.

The embodiments shown so far have been applied to the field of rodent monitoring. However, the person skilled in the art will understand that all forms of animal or plant monitoring requiring light or timed cycles of light can profit from the low-profile design of the system shown in the present disclosure. As its design is to fit neatly into existing cage or enclosure configurations, the device allows for increased control of individual cage environments. Other fields in which the device according to the present disclosure would be especially applicable are fields involving animals most active at night (e.g., reptiles) or experiments that require special lighting parameters. Moreover, the system can be configured to provide other forms of light besides just broad spectrum and infrared, such as ultraviolet light or color/wavelength specific light (i.e. colored light).

As already mentioned above, the device according to the present disclosure uses the broad-angle LEDs to uniformly light the entire cage. Because of the wide angle at which the LEDs project, each LED evenly lights all areas the entire cage. The combined lighting effects, of all the LEDs give cage lighting that is consistent in all areas with an adjustable intensity.

The present invention has been described with reference to the embodiments shown and described in the present writing. However, the person skilled in the art will devise additional and/or alternative embodiments, as encompassed by the scope of the enclosed claims.

What is claimed is:

1. An illumination and monitoring device comprising:
a container;
a container lid configured to close said container;
a circuit board attached to the container lid; and a plurality of controllable infrared light emitting diodes (LEDs) and controllable broad-spectrum LEDs, wherein the infrared LEDs and the broad-spectrum LEDs are distributed on the circuit board and provide light inside the container, the circuit board being located at a distance from and mounted spaced above a container top to allow air circulation, and wherein the illumination and monitoring device includes a filter paper located inside the container lid, the filter paper acting as a dispersion device, and the circuit board is located above the filter paper to shine light onto the container through the filter paper.

2. The device of claim 1, wherein intensity of the broad-spectrum LEDs is adjustable.

3. The device of claim 1, wherein intensity of the infrared LEDs is adjustable.

4. The device of claim 1, wherein intensity of both the broad-spectrum LEDs and the infrared LEDs is adjustable.

5. The device of claim 4, wherein intensity of both the broad-spectrum LEDs and the infrared LEDs is adjustable at the same time.

6. The device of claim 1, further comprising regulators to control intensity of at least one between the infrared LEDs and the broad-spectrum LEDs.

7. The device of claim 6, wherein the regulators are connected to a power switch, the power switch allowing the device to be connected to or disconnected from a power supply.

8. The device of claim 1, further comprising a timer to control intensity of the infrared LEDs and the broad-spectrum LEDs.

9. The device of claim 8, wherein the timer is connected to two indicator LEDs, the two indicator LEDs configured to show when a circuit is active with reference to a particular set of LEDs.

10. The device of claim 1, wherein the container is an animal container.

11. The device of claim 10, said animal container being a rodent cage.

12. The device of claim 1, wherein the container is a plant container.

13. The device of claim 1, wherein the container lid and the circuit board define a panel which covers the container.

14. The device of claim 1, wherein an array of holes is drilled into the circuit board, the holes further allowing air circulation.

15. The device of claim 1, wherein the filter paper located in the entirety of the container lid comprises a layer of filter paper.

16. The device of claim 1, wherein the circuit board is detachable from the container lid.

17. The device of claim 1, wherein the circuit board comprises two or more sets of LEDs, which are independently connected to downstream circuitry, each of the two or more sets of LEDs comprising independent circuits, timers and voltage regulators.

18. A device for continuous monitoring of animals or plants in a container, comprising:
a container;
a container lid closing said container; and
a circuit board attached to the container lid;
the device further comprising:
a first plurality of illumination devices mounted on the circuit board and providing light inside the container at a first wavelength or first series of wavelengths;
a second plurality of illumination devices mounted on the circuit board and providing light inside the container at a second wavelength or second series of wavelengths, the second wavelength or second series of wavelengths being invisible to the animals;
a first light intensity regulator to control light intensity of the first plurality of illumination devices; and
a second light intensity regulator to control light intensity of the second plurality of illumination devices, wherein the circuit board is located at a distance from and mounted spaced above a container top to allow air circulation, and wherein the device for continuous monitoring of animals or plants in a container includes a filter paper located inside the container lid, the filter paper acting as a dispersion device, and the circuit board is located above the filter paper to shine light onto the container through the filter paper.

19. The device of claim 18, further comprising a third light intensity regulator to control light intensity of both the first plurality of illumination devices and the second plurality of illumination devices at the same time.

20. The device of claim 18, further comprising a timer to allow timed control of at least one of the first plurality of illumination devices and the second plurality of illumination devices.

21. The device of claim 18, wherein the first light intensity wavelength is selected from the group consisting of a 880 nm, 920 nm and 940 nm.

22. The device of claim 18, further comprising a video recording system associated with the container to monitor the animals inside the container.

23. The device of claim 22, wherein the video recording system has infrared capability.

24. The device of claim 1, wherein the infrared LEDs and the broad-spectrum LEDs are connected together on the circuit board.

25. The device of claim 1, wherein the circuit board is affixed to respective corners of the container lid.

26. The device of claim 1, wherein the circuit board is screwed into respective corners of the container lid.

27. The device of claim 18, wherein the circuit board is affixed to respective corners of the container lid.

28. The device of claim 18, wherein the circuit board is screwed into respective corners of the container lid.

29. The device of claim 18, wherein the container lid and the circuit board define a panel which covers the container.

30. An illumination and monitoring device comprising: a container having an indentation on a container top; a circuit board sitting in the indentation on the container top; and a plurality of controllable infrared light emitting diodes (LEDs) and controllable broad-spectrum LEDs, wherein the infrared LEDs and the broad-spectrum LEDs are distributed on the circuit board and provide light inside the container; the circuit board being located at a distance from and above a bottom of the indentation to allow air circulation, and wherein the illumination and monitoring device includes a filter paper, the filter paper acting as a dispersion device, and the circuit board is located above the filter paper to shine light onto the container through the filter paper.

* * * * *